United States Patent
Halstead, Jr. et al.

(10) Patent No.: US 6,670,969 B1
(45) Date of Patent: Dec. 30, 2003

(54) INTERFACE FRAMES FOR THREADS

(75) Inventors: Robert H. Halstead, Jr., Belmont, MA (US); David A. Kranz, Arlington, MA (US); Stephen A. Ward, Watertown, MA (US)

(73) Assignee: Curl Corporation, Cambridge, MA (US)

( * ) Notice: Subject to any disclaimer, the term of this patent is extended or adjusted under 35 U.S.C. 154(b) by 736 days.

(21) Appl. No.: 09/607,120

(22) Filed: Jun. 29, 2000

(51) Int. Cl.[7] ................................................. G09G 5/00
(52) U.S. Cl. ..................... 345/762; 345/853; 707/103 R
(58) Field of Search ................................. 345/762, 853; 707/102, 103 R, 103 Y, 103, 103 Z, 104.1; 715/513; 709/100, 328

(56) References Cited

U.S. PATENT DOCUMENTS

| | | | | |
|---|---|---|---|---|
| 5,877,764 A | * | 3/1999 | Feitelson et al. | 345/808 |
| 6,035,321 A | * | 3/2000 | Mays | 709/103 |
| 6,105,053 A | * | 8/2000 | Kimmel et al. | 709/105 |
| 6,487,578 B2 | * | 11/2002 | Ranganathan | 709/104 |

FOREIGN PATENT DOCUMENTS

EP    0 929 033 A2    7/1999

OTHER PUBLICATIONS

Myers, B. et al., "Declarative Programming in a Prototype–Instance System: Object Oriented Programming without Writing Methods," *Association for Computing Machinery*, 27:10 (184–200), Oct. 1, 1992.

Shimizu, K. et al., "Hierarchical Object Groups in Distributed Operating Systems," *Distributed Computing Systems*, Jun. 1988, 8th International Conference, IEEE Comput. Soc. Pr., Jun. 13, 1998, (pp. 18–24).

Patterson, J.F. et al., "Rendevous: An Architecture for Synchronous Multi–User Applications," *Proc. of Conference on Computer–Supported Cooperative Work*, Los Angeles, CA, Oct. 1990, (pp. 317–328).

* cited by examiner

*Primary Examiner*—Ba Huynh
(74) *Attorney, Agent, or Firm*—Hamilton, Brook, Smith & Reynolds, P.C.

(57) ABSTRACT

The present invention provides for operations on objects in a hierarchy by partitioning the hierarchy into subhierarchies, each subhierarchy being associated with a thread interface frame. Operations of the thread interface frame are executed within threads acting on objects in the subhierarchy. When needed, the effects of an operation are stored in the thread interface frame, allowing the effects to be forwarded to another subhierarchy accessed by another thread.

42 Claims, 8 Drawing Sheets

INTERFACE FRAMES FOR THREADS

BACKGROUND OF THE INVENTION

This invention relates generally to multi-threaded programming and more specifically to a method of providing thread-safe access to data having a hierarchical structure.

A computer program is a sequence of instructions that can be executed by a computer. Instructions within computer programs can be organized into threads for the purposes of separating functionality. A thread is a process that is part of a larger process or program. Threads may be executed concurrently or in a round-robin scheduling scheme. Threads generally provide a technique for organizing code in computer programs, allowing improved performance and responsiveness to external interfaces.

Data accessed by computer program threads can be organized in a hierarchical fashion. These hierarchies can store data, represented by objects, such that data retrieval and maintenance operations are improved. Web content, including text and graphics, is often organized in hierarchies. Languages exist to define these hierarchies. For example, eXtensible Markup Language ("XML") is a specification for designing formats for text data that allows for text objects to be organized into hierarchies (i.e., XML documents). XML lets Web developers and designers create customized tags that offer flexibility in organizing and presenting information.

A common way to build object-based systems for use with multiple threads is to associate a lock with each object. Operations that might be performed incorrectly if multiple threads were simultaneously accessing an object are defined as synchronized, that is, the operation will interact with a locking mechanism to insure the proper order of execution. Whenever a synchronized operation is performed on an object, the object's lock is first obtained, preventing any other thread from performing any synchronized operation on the object until the completion of the operation holding the lock. While this method of synchronization is useful for many purposes, it frequently is not suitable for an interconnected set of objects in a hierarchical structure. Problems may arise because an operation on an object frequently cannot be completed without performing operations on its parent or child objects. In a graphical user interface (GUI), for example, a slider control object may be defined as a child of the parent dialog object. Now, consider what happens if a thread A performs an operation on the slider object at about the same time as another thread B performs an operation on the dialog object. Thread A will lock the slider object and thread B will lock the dialog object, but if thread A's operation cannot be completed without first locking all its ancestor objects and thread B's operation cannot be completed without first locking all its descendant objects a classic "deadlock" situation will occur and result in both threads becoming blocked forever, causing portions of the graphical user interface to become inoperative.

A simpler way to support operations on objects in a hierarchy is to allow just one thread at a time to perform operations on objects in the hierarchy. Depending on the nature of the system, such an architecture still offers some scope for multithreading if there are multiple hierarchies or there is a mechanism for transferring control of a specific hierarchy from one thread to another. With multiple hierarchies (e.g., several windows being displayed on the screen, and the objects displayed in each window being contained in a separate hierarchy associated with each window), each hierarchy can be under the control of a different thread. Multithreading can also be provided by using a mechanism for transferring control of a hierarchy from one thread to another. With a transferring mechanism, before a thread A could perform an operation on an object, thread A would first have to gain control of the hierarchy containing the object. If some other thread B controls the hierarchy, thread A would have to wait for thread B to finish its current operation in the hierarchy and relinquish control of it. Implementing either of these cases will provide limited multithreading. An alternative mechanism, representing the simplest possible system, provides that a given thread is the only thread that ever performs any operation on any object in the hierarchy. This approach can prevent locking problems, but only provides multithreading when independent hierarchies are controlled by different threads. In all these cases, deadlock is avoided because at any point in time there is at most one thread that is in the process of performing any operation on any object in a given hierarchy. Thus, no matter what objects in the hierarchy need to be accessed in order to perform an operation, it is guaranteed that no other thread is currently accessing any of those objects.

SUMMARY OF THE INVENTION

An operation within a hierarchy often involves accessing multiple objects. Problems arise when using threaded programming techniques if an operation on an object cannot be completed without performing operations on its parent or child objects. Therefore, these existing methods of providing thread-safe access in a mult-threaded environment are less than adequate or ideal.

In a single-threaded environment the appearance of concurrent access to multiple objects can be achieved by emulating multi-threading using a polling technique. The single thread can thus respond to multiple requests and emulate concurrent access, but such programming is error-prone and often cannot use standard library functions because they are not written to include the requisite polling operations.

Multi-threaded solutions often involve locks to insure proper access to multiple objects. One multi-threading technique involves creating a lock per object. It is extremely difficult to design all operations that can be performed on objects in a way that is free from deadlock when a lock-per-object synchronization strategy is used. In addition, the cost of just obtaining and releasing locks for all of the objects involved in an operation can be very substantial, in many cases dominating all other costs of performing the operation. Alternate multi-threading techniques include: 1) using a separate thread for each separate hierarchy, 2) using one thread that is switched between each separate hierarchy and 3) using a separate, hard-coded, thread for each separate hierarchy.

There are some operations that are not handled very satisfactorily by any of the techniques discussed above. Therefore, a general mechanism allowing multiple threads of control to work together within an application that uses hierarchies is preferable. In these situations, it is often highly desirable to have different threads operating simultaneously in different parts of a hierarchy. One example of such a situation is where a graphical window is defined with several panes, each of which is showing an independently controlled animated sequence of images. Another example is a Web browser application where it is desirable to assign to one thread the responsibility for controlling the content displayed in the browser window, while a different thread controls the menus, buttons, and other user-interface elements that are used to control the browser application. In these cases, it is desirable to have the user-interface elements that control the application remain responsive, even while the content to be displayed is being computed or downloaded.

Accordingly, it would be desirable to provide methods and apparatus for ensuring thread-safe access to a hierarchy of objects. The present invention provides a mechanism allowing different threads the ability to operate simultaneously in different parts of a hierarchy. This satisfies the requirements of speed and safety, without returning to the deadlock-prone model in which every object has its own lock. The present invention utilizes a mechanism for partitioning a hierarchy into subhierarchies, each of which can be controlled by a different thread. Using this mechanism, such subhierarchies have thread interface frames at their roots. A thread interface frame provides a way to partition a hierarchy and provide efficient operations on the hierarchy. A thread interface frame can be a program interface that can include a set of methods, procedures and/or functions. The descendant objects of a thread interface frame can be manipulated by a different thread from the thread that manipulates the ancestor objects of the thread interface frame. In order to provide this type of access safely, the thread interface frames have special implementations of operations that require accessing objects on opposite sides of the thread interface frame within the hierarchy. The implementations of these operations in the thread interface frames can use techniques that are more expensive (in time, space, or both) than the standard implementations of these operations that are used on all other objects, but the overall impact on system performance is mitigated by the fact that the extra time and space costs are only incurred when the thread interface frame is used, rather than being incurred on operations at every object. It is expected that thread interface frames will be used only in those situations where it is important to enable more than one thread to perform operations simultaneously within the same hierarchy.

An embodiment of the present invention provides a method of operating on objects in a hierarchy by partitioning the hierarchy into subhierarchies, each subhierarchy containing objects and being associated with a thread interface frame. Operations of the thread interface frame are then executed within threads acting on objects in the subhierarchy. When needed, the effects of an operation are stored in the thread interface frame, allowing the effects to be forwarded to another subhierarchy accessed by another thread.

One effect of an operation can be to control access to objects in the subhierarchy, allowing just one thread, at any given time, access to the objects in the subhierarchy. The access can be controlled by a lock object associated with the thread frame interface.

One such operation arises in the processing of nonlocal options. Objects of a class may contain fields. Options are a mechanism for a class that work like fields but offer a different space/time tradeoff. Options can hold values and optionally have default value settings. Options can be local or nonlocal. Local options affect only the object upon which they are defined. Nonlocal options provide a mechanism by which the setting of an option value on one object can influence the value that is read using the same option name on another object. In one embodiment of the present invention, the effect of the operation comprises setting the nonlocal option value, influencing the option value that is read using the same option name on another object in the hierarchy. The thread interface frame can maintain a copy of the nonlocal option value, such that the operation of reading the value will not require access to the parent of the thread interface frame in the hierarchy to retrieve the nonlocal option value.

In another embodiment of the present invention, the effect of the operation is to propagate a nonlocal option value change notification through the thread interface frame to objects in the hierarchy. In further embodiments of the present invention, the effect of the operation comprises: getting the nonlocal option value, including accessing ancestor objects of the subhierarchy; and registering for change notification events on the nonlocal option.

In yet another embodiment of the present invention, the hierarchy of objects contains graphical objects. The graphical objects can be used to represent the components of a graphical user interface. In such an embodiment, the effect of the operation may further comprise: repainting a screen region represented by the hierarchy; renegotiating a layout for a screen region represented by the hierarchy; and obtaining width and/or height preferences for a screen region represented by the hierarchy.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
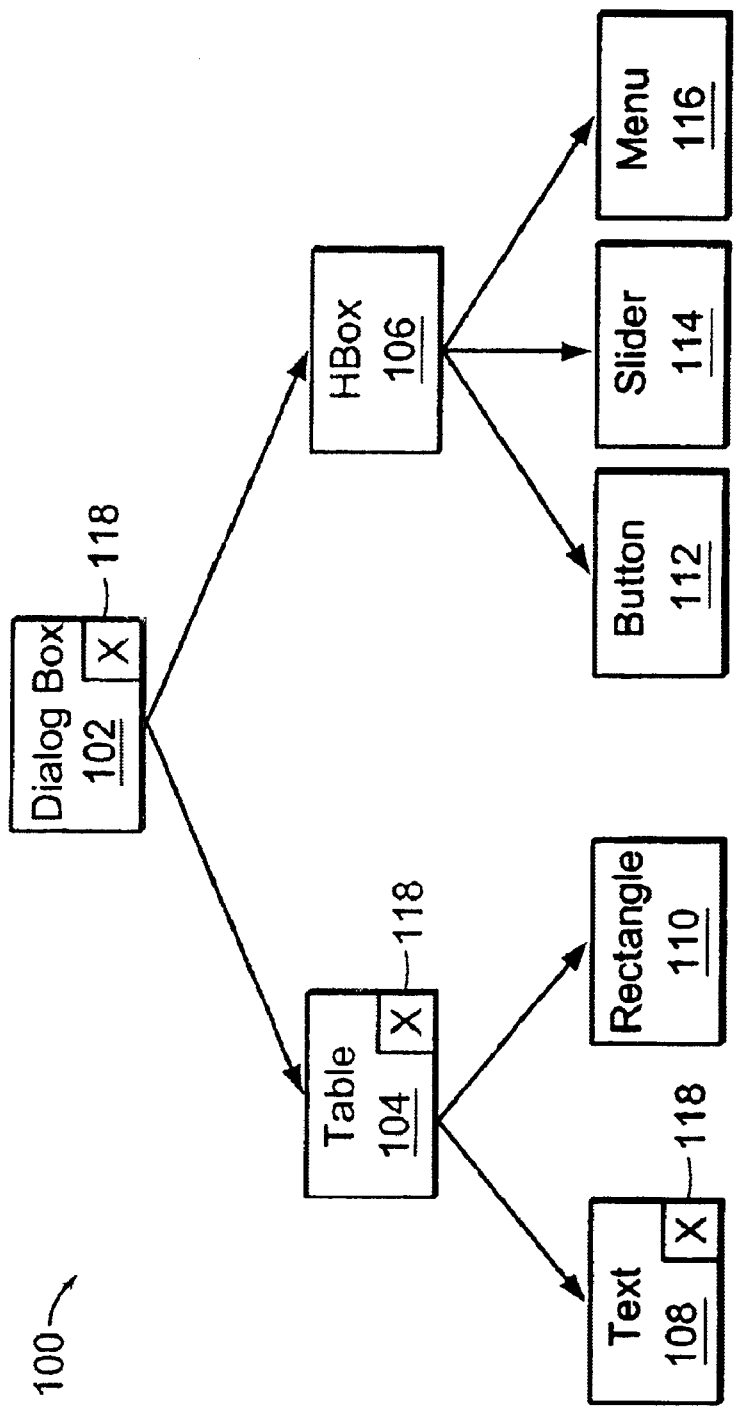
FIG. 1 is an illustration of a graphical object hierarchy containing graphical objects and nonlocal options.

A description of preferred embodiments of the invention follows. To facilitate clarity and ease of understanding, the description is presented in terms of a GUI. However, one skilled in the art will understand that the principles disclosed are equally applicable to other situations in which multiple threads may process a hierarchy of objects.

Graphical User Interfaces ("GUI") are created and controlled by computer software programs. It is frequently useful to have more than one active thread within a program manipulating an interactive graphical user interface. A principal reason for constructing multiple threads in a computer software program is the desire for the graphical user interface, or portions of it, to remain responsive, even if one or more threads within the program are busy carrying out other tasks (e.g., computations). For example, in a typical Web browser it is desirable for the "Stop" button to remain responsive even while an HTML page is being loaded, such that the user can interrupt the loading operation without waiting for it to finish. Similarly, a user might wish to launch another browser page, view the source code for a page, or perform any number of other operations while unrelated activities, such as the loading of a page, continue simultaneously. Computer systems that present a graphical user interface typically manage the interface using a large number of objects, such that a different object is associated with each GUI element. Often, a large number of additional objects are also present, serving support or interconnection roles. It is common to organize these objects into a graphical hierarchy. For example, a dialog box object may be the root of a graphical hierarchy containing a table and a horizontal box (HBox) object, the table may contain text and rectangle objects, whereas the HBox may contain button, slider and menu objects.

Any system in which only certain threads are allowed to access certain objects could be implemented as a matter of programming convention (i.e., programmers are responsible for programming an application in such a way that threads access graphical objects according to stated rules) or the discipline could be enforced by run-time mechanisms (e.g., by associating a lock with each graphical hierarchy). In the latter case, before performing an operation on a graphical object, a thread would first need to locate and obtain the lock associated with the graphical hierarchy to which the object belongs. The step of obtaining the necessary lock could be built into the implementation of every operation on a graphical object; in this embodiment each operation would begin by locating the lock object and either verifying that the current thread already has the lock or obtaining the lock before proceeding with the operation. A suitable step determining whether to release the lock would also have to be performed at the conclusion of the operation. In the case where only one thread at a time is allowed access to an entire graphical hierarchy, it would be natural to attach this lock to the graphical object at the root of the graphical hierarchy.

Whether to establish the discipline as a matter of programming convention or enforce it by including locking steps into graphical operations involves a tradeoff between safety and speed. It is safer to build the locking steps into the graphical operations, making it impossible for an incorrectly or maliciously designed program to violate the chosen discipline. Increased speed can be obtained by omitting the locking steps and relying on the programmer to ensure that the proper discipline is observed; this enables programs to run at a greater speed because many of the locking steps can be omitted. The choice of locking mechanisms to use in a given situation depends on the cost and likelihood of safety violations and on the value of achieving the highest possible speed for graphical operations.

Graphical hierarchies can be partitioned into subhierarchies in order to perform separate operations on different sections of the graphical hierarchy simultaneously. A thread interface frame provides a way to partition a graphical hierarchy and provide efficient graphical operations on the hierarchy.

There are two fundamental categories of operations that may need to propagate through a hierarchy: upward operations and downward operations. Upward operations progress from an object to its parent, and often beyond the parent to other ancestors. Downward operations progress from an object to its children and perhaps to more remote descendants. An exemplary upward operation is looking up the value of an option, whereas an exemplary downward operation is propagating the effects of a change to an option setting.

Objects in a computer system can be used to represent aspects of the system. A GUI can be represented using objects that represent various components of the GUI (e.g., dialog boxes, tables, rectangles and text). The objects can be arranged in a graphical hierarchy to facilitate management and manipulation. Attributes of the objects in a graphical hierarchy can be stored using fields (e.g., background color and font size). Objects of a class may contain fields. Options are a mechanism for a class that work like fields but offer a different space/time tradeoff. Options can hold values and optionally have default value settings. Options can be local or nonlocal. Local options affect only the object upon which they are defined. Nonlocal options provide a mechanism by which the setting of an option value on one object can influence the value that is read using the same option name on another object. Options are described in United States Patent Application entitled "Options Mechanism", filed on Nov. 1, 1999 having Serial No. 60/162,825 by a co-owner of the present invention, the teachings of which are herein incorporated by reference in their entirety.

Nonlocal options provide a mechanism by which the setting of an option value on one object can influence the value that is read using the same option name on another object. This sort of capability is useful in building hierarchies of graphical objects, where, for example, setting the background color on a table affects the background color of the objects within the table. The nonlocal options mechanism is formulated in terms of an option hierarchy that generally corresponds to the graphical hierarchy. An object in an option hierarchy can have one "option parent" and some number (possibly zero) of "option children." In the case of a graphical hierarchy, an object's option parent is generally the same as its graphical parent, and an object's option children are generally the same as its graphical children. In particular, the option child of a thread interface frame is its graphical child and the option parent of a thread interface frame is its graphical parent.

If T is an object and X is declared as a nonlocal option, the evaluation of the expression "T.X" proceeds as follows. If there is an option item corresponding to X on T's option list, the associated value is returned. If not, the same operation is repeated on T's option parent, and so on until either a value for X is found or an object with no option parent is reached. If no value is found anywhere along the chain, then the default value of the option is returned. Similarly, when the operation "{is_set? T.X}" is performed on a nonlocal option X, the result is true if the option is set anywhere along the path of option parents starting with the object T. Setting and unsetting of nonlocal options work in much the same way as with local options. In particular, when these operations are performed on an object, they never affect the object's option parent or more distant option ancestors. The operation {set T.X='blue'} adds or updates an option item attached to T, and the operation

{unset T.X} removes the option item that is attached to T and corresponds to X; if there is no such option item, then the operation does nothing.

Change handlers can be specified for local or nonlocal options. If a class such as Rectangle, for example, has a nonlocal option declaration such as {define_nonlocal_option background:any="white"
{self.repaint_background background}} then the repaint_background method of Rectangle will be invoked every time there is a change in the value of the background option. This means that the change handler needs to be invoked whenever the value of the background option is set on the object or on any ancestor of the object whose background value is visible to the object. For efficiency, it is also desirable to limit the propagation of option-change notifications to subtrees of the option hierarchy containing at least one object that has a change handler for the option in question. This goal is accomplished by having objects register the option names for which they need to receive change notifications.

When an option parent, somewhere in the hierarchy, gains a new child, the parent invokes a method to reregister for notifications relating to options, unless it can determine that the addition of the new child to the hierarchy does not change the parent's set of registered options. This invocation prompts the option parent to recompute its own set of registered options and, if necessary, propagate the reregister request higher up in the option hierarchy. Similar processing can occur when removing an object from the option hierarchy, reducing its parent's set of registered options. Now when a set or unset operation occurs on a nonlocal option X at an object T, the change handlers for X are invoked on T, just as though X were a local option. Each option child of T that has registered for option X is notified of the change. If the option X is also set at a descendant of T, no action needs to occur at that descendant because its value shadows the value T.X. If the option X is not set at a descendant of T, then that descendant's change handlers for X (if any) are invoked and then the process is repeated for those option children of the descendant that have registered for changes on X.

In general, when a thread in the process of performing an upward operation reaches a thread interface frame, it will have to determine whether it is authorized to access objects in the graphical hierarchy that includes the graphical parent of the thread interface frame. The determination will yield one of three results. First, if the thread is already the thread authorized to access objects in the parent's hierarchy, the operation can simply continue as though the interface frame were not present. Second, if no thread is currently recognized as the thread authorized to access objects in the parent's hierarchy, this thread can simply obtain access to the parent's hierarchy and proceed with its operation. Finally, if another thread is the thread authorized to access objects in the parent's hierarchy, the first thread will need to use an interthread communication mechanism to request the second thread's assistance in completing the operation. One alternative is for the threads to communicate using "mailboxes" or event queues: the first thread would put an entry into the second thread's mailbox or event queue describing the action that needs to be taken. In order to avoid deadlock, it is important that the first thread not block while waiting for the second thread to complete the operation. If the first thread becomes blocked, then it would be unable to handle requests from the second thread that might need to be satisfied before the second thread could act on the first thread's upward request. The need to avoid blocking imposes certain constraints, discussed below, on the design and implementation of the operations that a thread interface frame will handle.

FIG. 1 is an illustration of a graphical object hierarchy containing graphical objects and nonlocal options. A graphical hierarchy 100 containing a dialog box 102 has table 104 and HBox 106 as child objects. The HBox object places a collection of graphics in a horizontal row. The table 104 has a text object 108 and a rectangle object 110 as children. The HBox 106 has a button object 112, a slider object 114 and a menu object 116 as children. The dialog box 102, table 104, and text object 108 are sensitive to the value of nonlocal option X 118. Nonlocal option X 118 represents an option that, when set at one object, affects descendants of that object that are also sensitive to the value of nonlocal option X 118. For example, nonlocal option X 118 may represent the background color to use when displaying a graphical object, the font size to use for captions, or the indentation setting to use for paragraphs.

Figure 2:
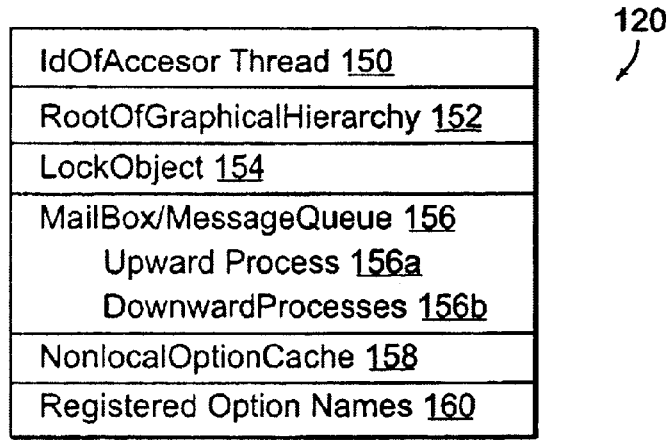
FIG. 2 is an illustration of a thread interface frame as defined in one embodiment of the present invention.

FIG. 2 is an illustration of a thread interface frame as defined in one embodiment of the present invention. The thread interface frame 120 can be implemented as an object class containing various elements for use in the management of the graphical subhierarchy. IdOfAccessorThread 150 contains the thread identifier of the thread that is currently accessing the graphical subhierarchy. RootOfGraphicalHierarchy 152 contains a pointer to the root object in the graphical hierarchy that the thread interface frame 120 is a member of. LockObject 154 controls access to objects in the subhierarchy defined by the thread interface frame 120. The thread interface frame 120 contains a message queue, MailBox/MessageQueue 156, for the management of operations on objects in the subhierarchy. Upward operations are managed by the UpwardProcess 156a queue, and downward operations are managed by the DownwardProcess 156b queue. For more efficient access to nonlocal options, the thread interface frame 120 will cache values using the NonlocalOptionCache 158. Indications of options that the thread interface frame 120 tracks for changes are stored in a list of RegisteredOptionNames 160. The fields of the thread interface frame 120 in this preferred embodiment represent one set of capabilities provided by the thread interface frame; other implementations may necessarily add or delete specific fields.

Figure 3:
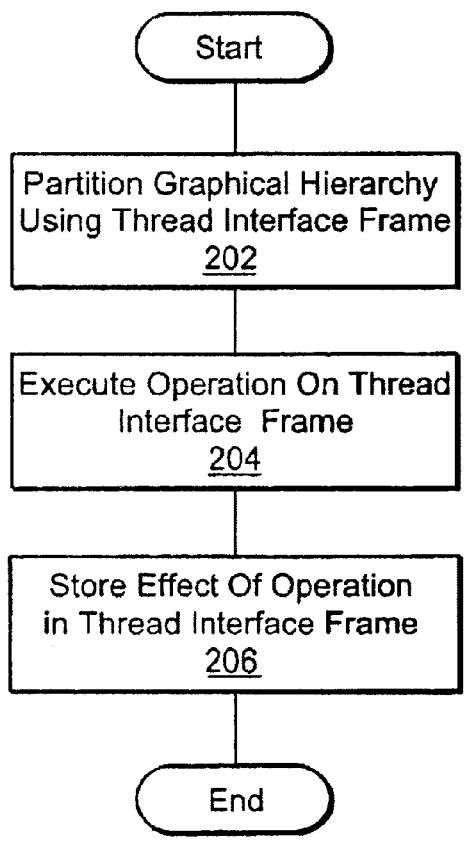
FIG. 3 is a flow diagram showing steps in a method of controlling access to objects in a graphical object hierarchy as used in an embodiment of the present invention.

FIG. 3 is a flow diagram showing steps in a method of controlling access to objects in a graphical object hierarchy as used in an embodiment of the present invention. At step 202 the graphical hierarchy 100 is partitioned into subhierarchies, each subhierarchy being associated with a thread interface frame. An operation of the thread interface frame is then executed within the thread acting on objects in the associated subhierarchy (step 204). At step 206, effects of the operation are stored in the thread interface frame allowing these effects to be forwarded to another subhierarchy accessed by another thread. One effect of the operation can be to control access to objects in the subhierarchy, allowing just one thread, at any given time, access to the objects in the subhierarchy. The access can be controlled by a lock object associated with the frame interface thread. Another effect of the operation is to propagate a nonlocal option value change notification through the thread interface frame to objects in the graphical hierarchy.

Figure 4:
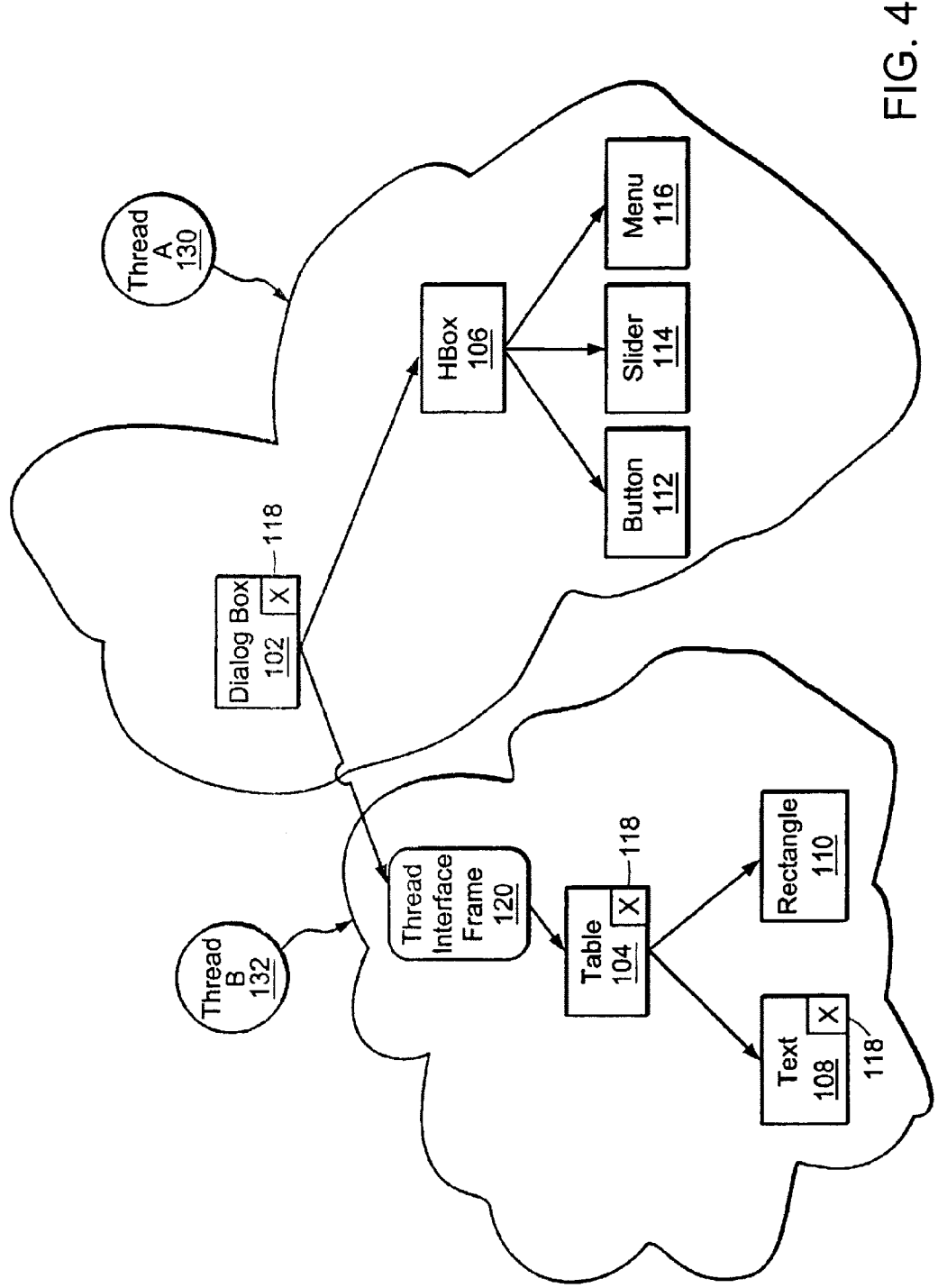
FIG. 4 is an illustration of a nonlocal option set operation according to an embodiment of the present invention.

FIG. 4 is an illustration of a nonlocal option set operation configured according to an embodiment of the present invention. When the value of nonlocal option X 118 is set (e.g., on dialog box object 102), the objects that can see that value change (i.e., objects for which an option lookup operation will return the value of the changed option binding) must be notified of that change if they have registered for such notifications. Since all of the objects to be notified are graphical descendants of the object on which the set operation is performed, this is a downward operation. If thread A 130, while performing this operation, reaches thread interface frame 120 and thread B 132 is the thread currently authorized to access the subhierarchy of the objects headed by the thread interface frame 120, thread B 132 will need to be notified by placing an operation on the message queue of the thread interface frame so that it will continue the operation. This may be done by placing a suitable entry on thread B's 132 event queue and/or in a mailbox that describes pending work items and is associated with the thread interface frame 120. When thread B 132 processes this entry, thread B 132 will continue propagating the notification to the graphical descendants of the thread interface frame 120. Thread A 130 need not wait for this process to complete; therefore, there is no deadlock hazard.

Figure 5:
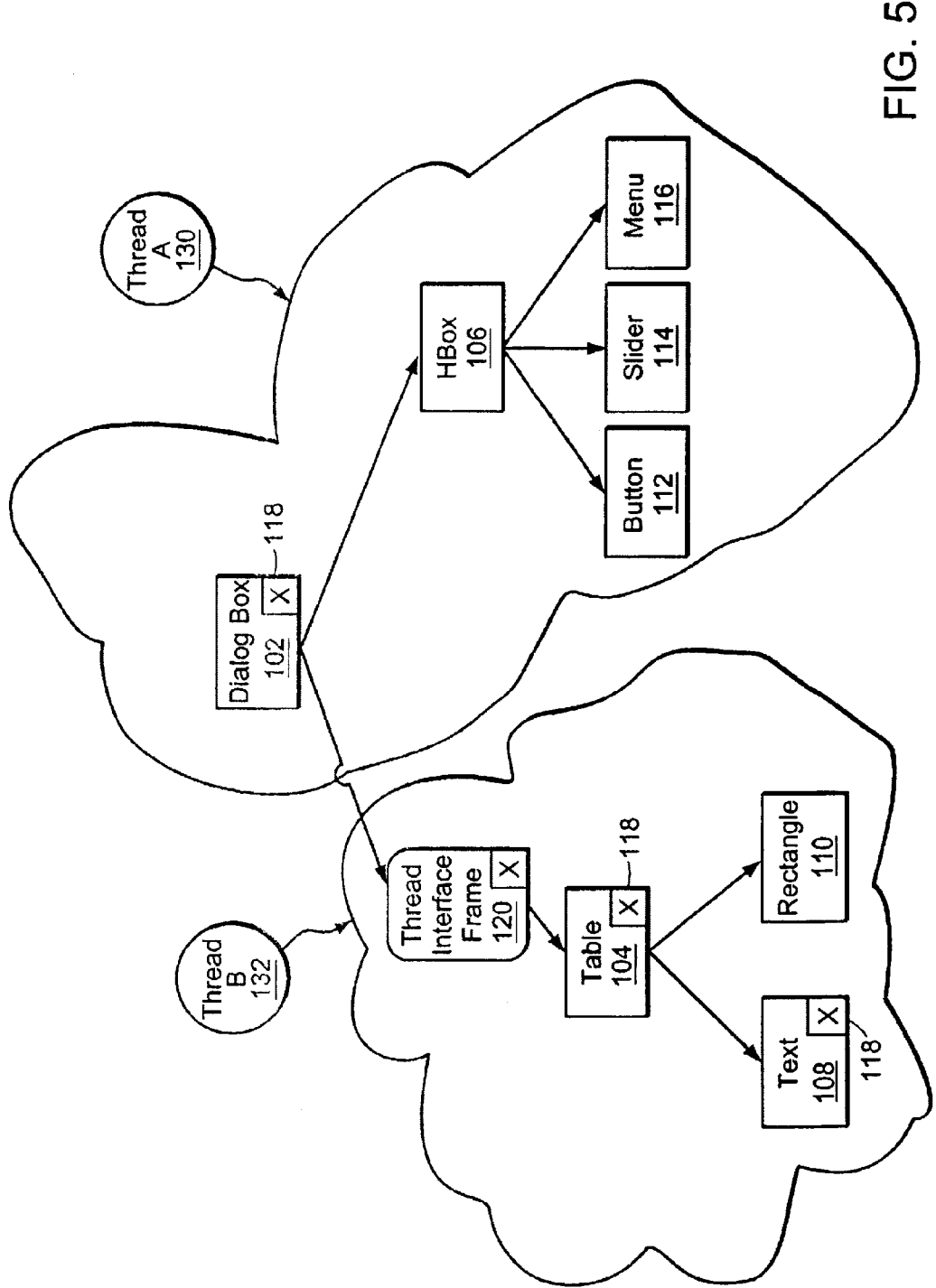
FIG. 5 is an illustration of a nonlocal option get operation according to an embodiment of the present invention.

FIG. 5 is an illustration of a nonlocal option get operation configured according to an embodiment of the present invention. Looking up the value of an option (i.e. a get) is an upward operation. Get is a synchronous operation where a return from the get operation is expected to include the option's value, so special care is needed to avoid deadlock when implementing this operation at a thread interface frame 120. One way to solve this problem entails having the thread interface frame 120 register to be notified of changes in the values of every nonlocal option that is known to exist, and to store the resulting values so that they can be returned without accessing the thread interface frame's parent. For example, looking up the value of a nonlocal option on the text object 108 may entail performing option gets on the table 104 and perhaps thread interface frame 120 objects, but there is not a need for the get operation to propagate to the dialog 102 objects.

Figure 6:
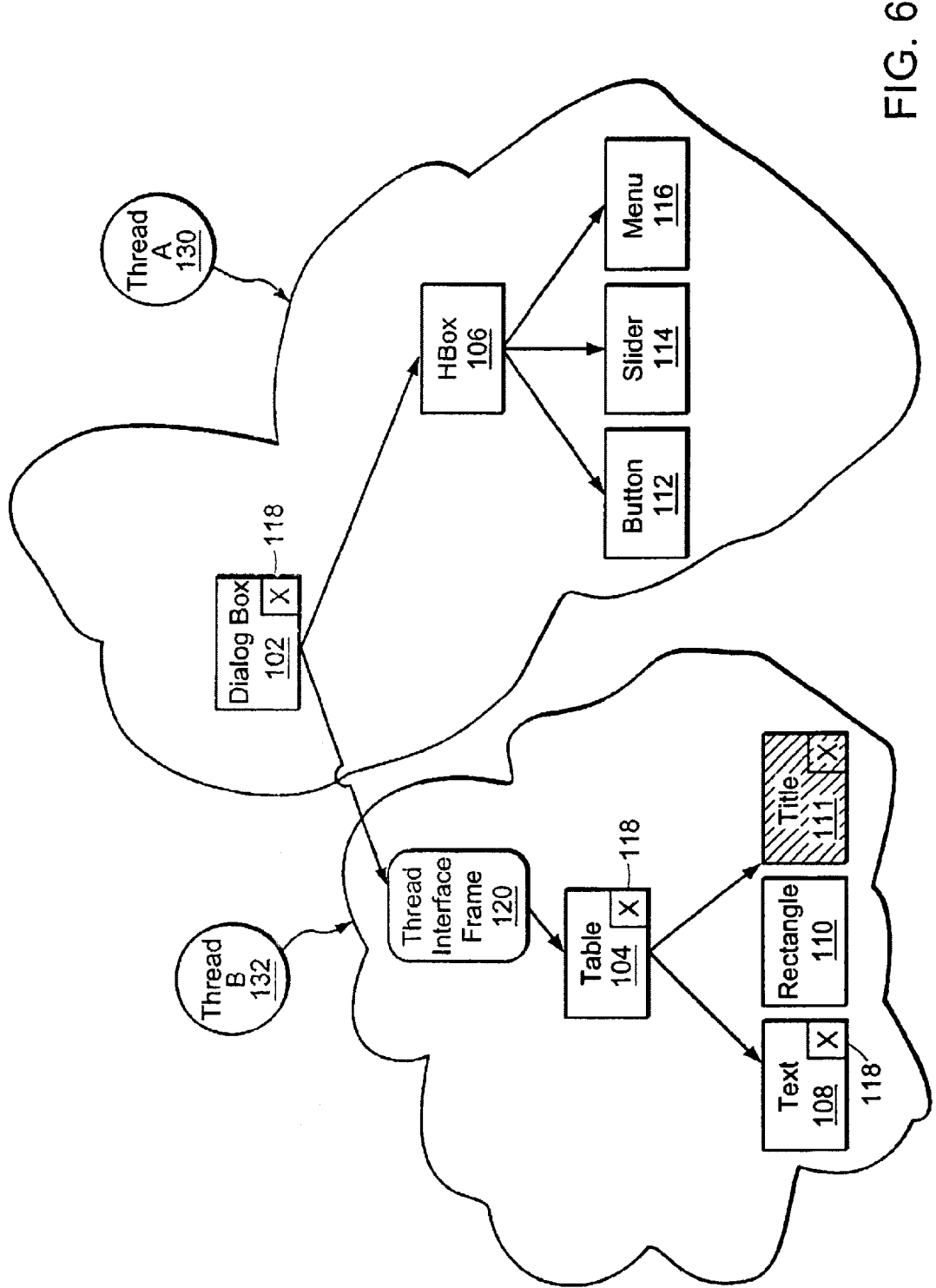
FIG. 6 is an illustration of a nonlocal option change notification operation according to an embodiment of the present invention.

FIG. 6 is an illustration of a nonlocal option change notification operation configured according to an embodiment of the present invention. When a new graphical object is added to a graphical hierarchy (e.g., title object 111), it may register to be notified of changes in certain nonlocal options (e.g., nonlocal option X 118). The registrations propagate through graphical parents (e.g., table 104 and dialog box 102), so this is an upward operation. When copies of nonlocal options are stored in thread interface frames 120, as discussed in connection with FIG. 5, this operation never needs to propagate through a thread interface frame 120. The thread interface frame 120 will already have registered for all nonlocal options that are known to potentially be of interest, so it will already receive notifications about changes in any nonlocal option's value (e.g., nonlocal option X 118), which it can propagate to the newly added title object 111 (and any other interested graphical objects).

Figure 7:
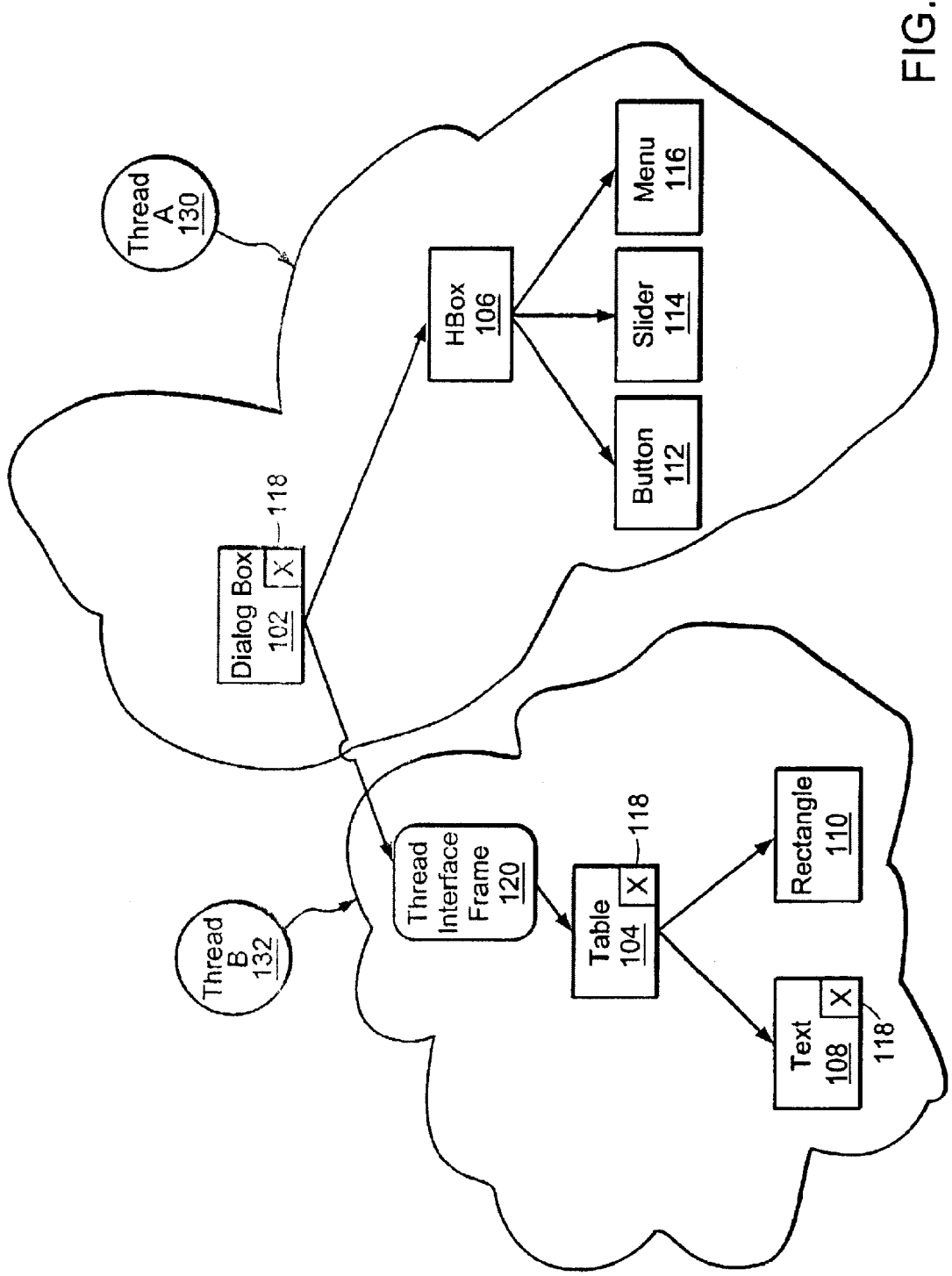
FIG. 7 is an illustration of a screen repaint operation according to an embodiment of the present invention.

FIG. 7 is an illustration of a screen repaint operation configured according to an embodiment of the present invention. When the state of a graphical object (e.g., rectangle 110) changes, it may need to request a repaint operation on some part of the screen region that belongs to it. Since such requests are passed through graphical parents (e.g., table 104) to the root of the graphical hierarchy (e.g., dialog box 102), this is an upward operation. When thread B 132 performs this operation and reaches a thread interface frame 120 where a different thread (e.g., thread A 130) controls access to an object in the upward chain, thread A 130 needs to continue the operation. This can be done by placing an entry on thread A's 130 event queue and/or in a mailbox associated with the thread interface frame 120. This entry will cause thread A 130 to eventually propagate the operation as required. As long as thread A 130 eventually performs this action, thread B 132 need not block waiting for the operation to complete, therefore deadlock is avoided in this case. Repainting operations are desirable to change the appearance of graphical objects on the screen. A graphical object's appearance can change when the object is moved or resized, or when some change occurs to parameters that define the graphical object.

Some changes in the state of a graphical object may require not just repainting the object but perhaps recomputing the size and position of the object on the display screen. Such requests are also passed upward through the graphical hierarchy. As with repaint requests the thread (e.g., thread B 132) that originates the operation need not wait for another thread (e.g., thread A 130) to complete the operation.

As part of a screen layout negotiation process, objects are required to provide width and height preferences when requested. Operations that request screen layout information from an object also perform this operation on objects that are their graphical children, so these are downward operations. Even though screen layout operations also return values, these operations must be implemented without blocking. Difficulties occur in the case where a thread A 130 is performing a layout operation and must obtain width or height preference information from a thread interface frame 120 that is the root of a graphical hierarchy currently controlled by another thread (e.g., thread B 132). Thread A 130 can place a request for layout information on thread B's 132 event queue, but thread A 130 cannot afford to block waiting for thread B 132 to service the request without creating a risk of deadlock. One solution to this problem is for the thread interface frame 120 to cache previously supplied width and height preferences and return them immediately when requested by thread A 130. To guard against the case in which the cached values are no longer valid, thread A 130 would simultaneously place a request on thread B's 132 event queue to recalculate the width or height preference that had been requested. If this calculation reveals that the cached value was invalid, the cache is updated with the newly computed value and the thread interface frame requests a fresh layout negotiation. The ensuing layout negotiation will pick up the correct value from the cache.

Figure 8:
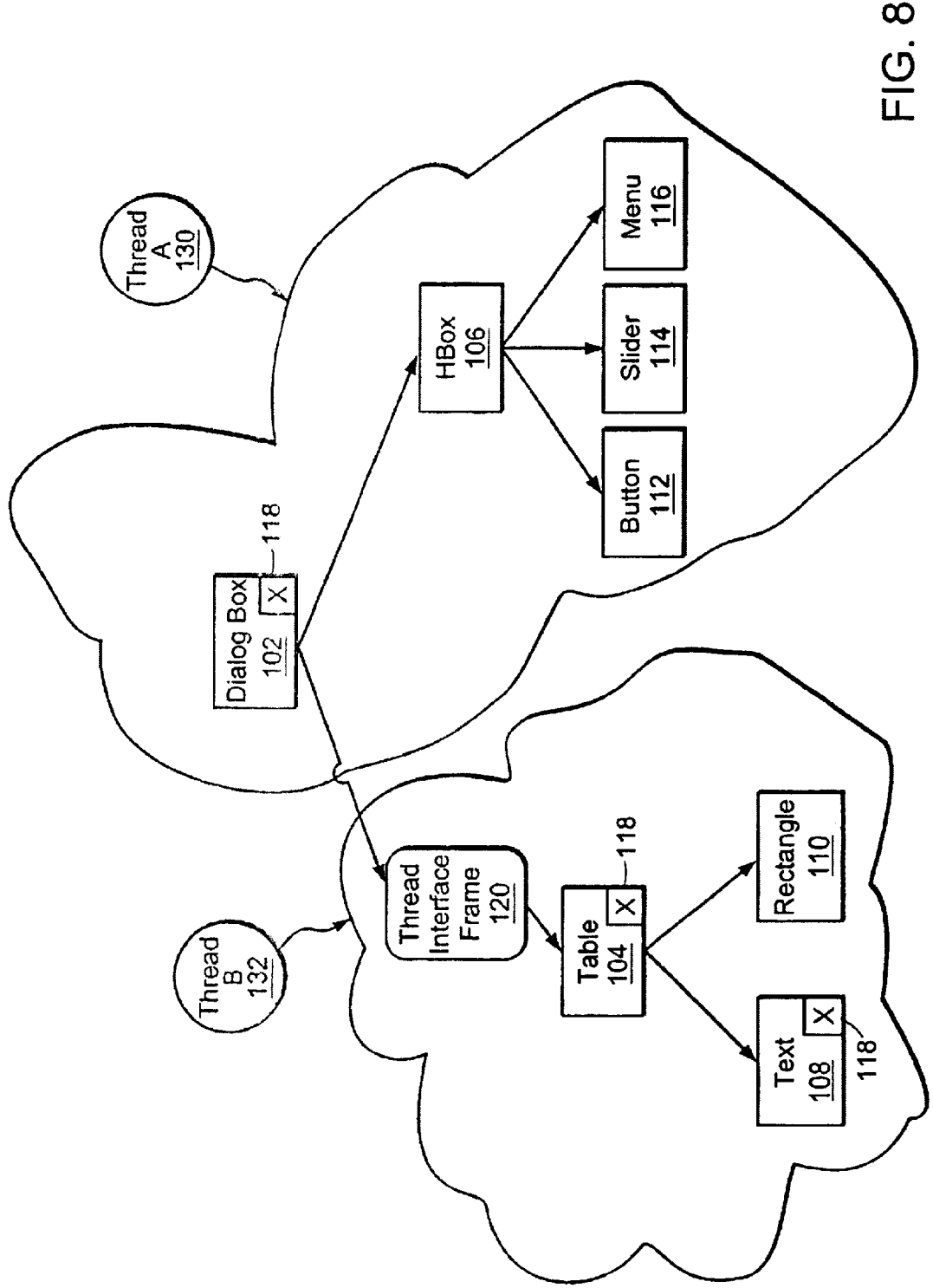
FIG. 8 is an illustration of the propagation of events in a graphical hierarchy.

FIG. 8 illustrates another important graphical operation: the propagation of events in a graphical hierarchy. When the user moves the mouse or other pointing device, or operates a button on the pointing device, an event is generated that contains, among other information, the coordinates of the pointing device's current position. This event is fired at the root object of the graphic hierarchy that contains the current pointer position and is then forwarded down the hierarchy, with each parent object forwarding the event to its child object (if any) that contains the pointer position. If, for example, the pointer is currently located within the boundaries of the rectangle 110, the event will need to be forwarded from the dialog box 102 through the thread interface frame 120 and the table 104, finally reaching the rectangle 110. Each of these objects can take actions triggered by the occurrence of the event. However, at each object the triggered actions must be performed by a thread that is authorized to access the object. Therefore, in passing from the dialog box 102 through the thread interface frame 120, processing of an event must be handed off from thread A 130 to thread B 132. The method for accomplishing this is very similar to the method for nonlocal option change notification discussed in connection with FIG. 4, and requires that a suitable entry be placed on the event queue of thread B 132 and/or in a mailbox associated with the thread interface frame 120.

Figure 9:
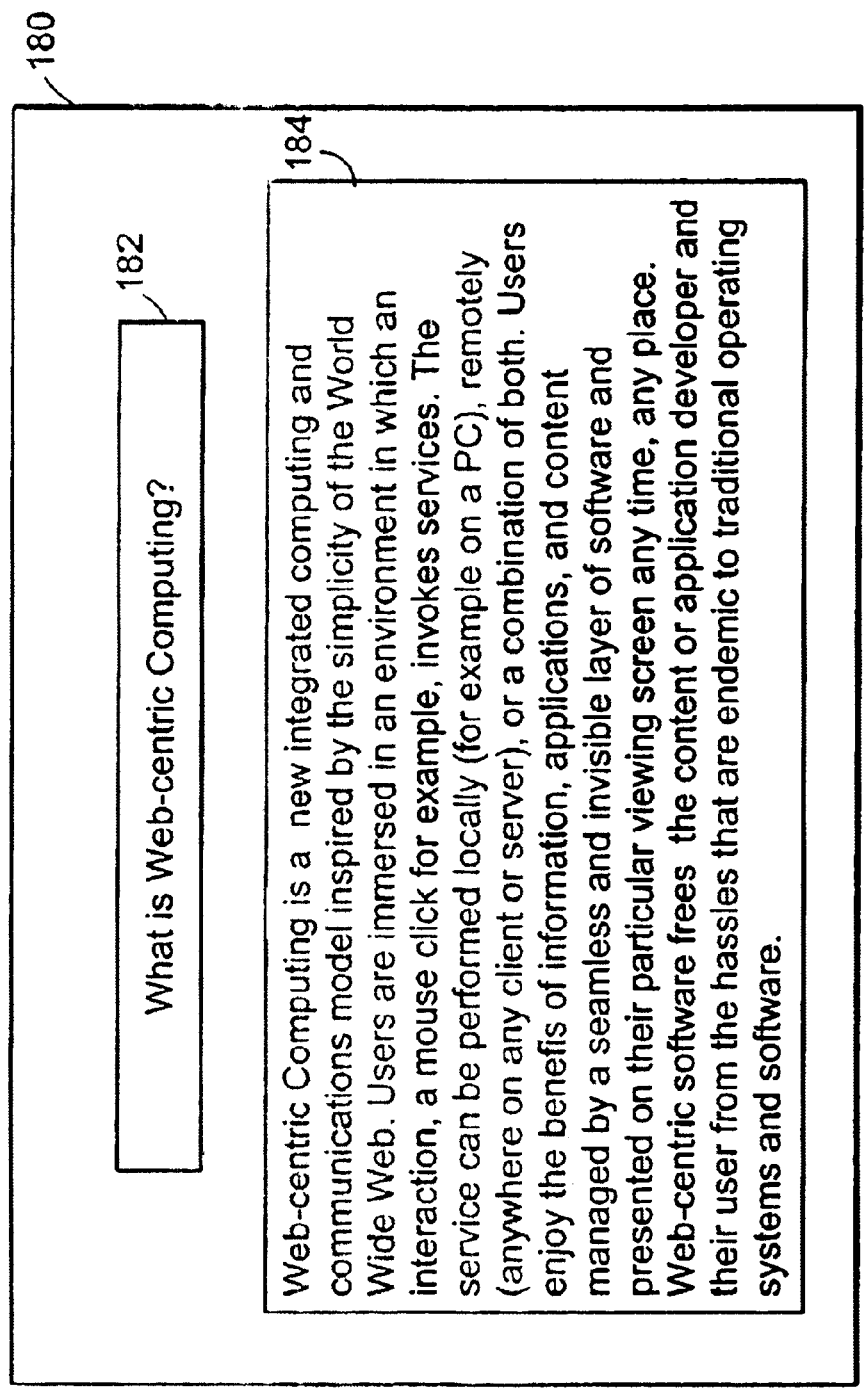
FIG. 9 is an illustration of a system for displaying graphical objects represented using thread interface frames.

FIG. 9 illustrates a system for displaying graphical objects represented using thread interface frames. The system displays Web page 180 containing viewable content using a Web browser program. Title TextBox 182 contains a title for a paragraph of textual information. The information TextBox 184 contains a paragraph of information. The Web page 180 can be the graphical parent of title TextBox 182 and information TextBox 184. User interactions with the graphical children of Web page 180 can be managed using a thread interface frame. An example of a user interaction on the parent graphical object (e.g., Web page 180) that can affect child graphical objects (e.g., title TextBox 182 and information TextBox 184) is an operation to change the graphical objects' background color. The color change operation can proceed through the graphic hierarchy using thread interface frames.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operating on a hierarchy of objects, the method comprising:
   partitioning the hierarchy into subhierarchies, and providing a thread interface frame between the subhierarchies; and
   within a thread, executing an operation on an object in one of the subhierarchies.

2. The method of claim 1 wherein the hierarchy of objects contains graphical objects.

3. The method of claim 1 further comprising the step of:
   forwarding an effect of the operation to another subhierarchy accessed by another thread by storing the effect of the operation in the thread interface frame between the subhierarchies; and
   wherein the thread is a process that is part of a larger process or program.

4. The method of claim 1 wherein the thread interface frame includes a programming interface supporting a set of functions to regulate access to objects in the subhierarchies.

5. The method of claim 1 wherein the thread interface frame provides change notification for propagating a nonlocal option value to objects in the hierarchy, the nonlocal option being capable of storing a value, storing a default value and having the ability to optionally influence a value that is read using the same nonlocal option name on another object.

6. The method of claim 5 wherein the thread interface frame maintains a copy of the nonlocal option value, such that the operation will not require access to a parent of the object in the hierarchy to retrieve the nonlocal option value.

7. The method of claim 6 wherein the thread interface frame maintains a copy of the nonlocal option value by registering for change notification events on the nonlocal option.

8. The method of claim 1 wherein the thread interface frame provides for propagating an event notification to objects in the hierarchy.

9. The method of claim 1 wherein the effect of the operation comprises setting a nonlocal option value, influencing the option value that is read using the same option name on another object in the hierarchy.

10. The method of claim 1 wherein the effect of the operation comprises getting a nonlocal option value, including accessing ancestor objects of the subhierarchy.

11. The method of claim 1 wherein the effect of the operation comprises registering for change notification events on a nonlocal option.

12. The method of claim 1 wherein the effect of the operation comprises repainting a region represented by the hierarchy.

13. The method of claim 1 wherein the effect of the operation comprises renegotiating a layout for a region represented by the hierarchy.

14. The method of claim 1 wherein the effect of the operation comprises obtaining width and/or height preferences for a region represented by the hierarchy.

15. An apparatus for operating on a hierarchy of objects, the apparatus comprising:
   a thread interface frame partitioning the hierarchy into subhierarchies; and
   a thread, executing an operation on an object in one of the subhierarchies.

16. The apparatus of claim 15 wherein the hierarchy of objects contains graphical objects.

17. The apparatus of claim 15 further comprising:
   an effect of the operation, forwarded to another subhierarchy accessed by another thread by storing the effect of the operation in the thread interface frame between the subhierarchies; and
   wherein the thread is a process that is part of a larger process or program.

18. The apparatus of claim 15 wherein the thread interface frame includes a programming interface supporting a set of functions to regulate access to objects in the subhierarchies.

19. The apparatus of claim 15 wherein the thread interface frame provides change notification for propagating a nonlocal option value to objects in the hierarchy, the nonlocal option being capable of storing a value, storing a default value and having the ability to optionally influence a value that is read using the same nonlocal option name on another object.

20. The apparatus of claim 19 wherein the thread interface frame maintains a copy of the nonlocal option value, such that the operation will not require access to a parent of the object in the hierarchy to retrieve the nonlocal option value.

21. The apparatus of claim 20 wherein the thread interface frame maintains a copy of the nonlocal option value by registering for change notification events on the nonlocal option.

22. The apparatus of claim 15 wherein the thread interface frame provides for propagating an event notification to objects in the hierarchy.

23. The apparatus of claim 15 wherein the effect of the operation comprises setting a nonlocal option value, influencing the option value that is read using the same option name on another object in the hierarchy.

24. The apparatus of claim 15 wherein the effect of the operation comprises getting a nonlocal option value, including accessing ancestor objects of the subhierarchy.

25. The apparatus of claim 15 wherein the effect of the operation comprises registering for change notification events on a nonlocal option.

26. The apparatus of claim 15 wherein the effect of the operation comprises repainting a region represented by the hierarchy.

27. The apparatus of claim 15 wherein the effect of the operation comprises renegotiating a layout for a region represented by the hierarchy.

28. The apparatus of claim 15 wherein the effect of the operation comprises obtaining width and/or height preferences for a region represented by the hierarchy.

29. A computer program product comprising:
a computer usable medium for operating on a hierarchy of objects;
a set of computer program instructions embodied on the computer usable medium, including instructions to:
partition the hierarchy into subhierarchies, and provide a thread interface frame between the subhierarchies; and
within a thread, execute an operation on an object in one of the subhierarchies.

30. The computer program product of claim 29 further comprising instructions to:
forward an effect of the operation to another subhierarchy accessed by another thread by storing the effect of the operation in the thread interface frame between the subhierarchies.

31. A propagated signal carried on an electromagnetic waveform, the signal comprising a set of computer program instructions to:
partition the hierarchy into subhierarchies, and provide a thread interface frame between the subhierarchies;
within a thread, execute an operation on an object in one of the subhierarchies.

32. The propagated signal of claim 31 further comprising instructions to:
forward an effect of the operation to another subhierarchy accessed by another thread by storing the effect of the operation in the thread interface frame between the subhierarchies.

33. A system for displaying objects represented in a hierarchy comprising:
a thread interface frame partitioning the hierarchy into subhierarchies; and
a thread, executing an operation on an object in one of the subhierarchies; and
a computer program displaying the objects.

34. The system of claim 33 wherein the hierarchy contains graphical objects.

35. The system of claim 33 further comprising:
an effect of the operation, forwarded to another subhierarchy accessed by another thread by storing the effect of the operation in the thread interface frame between the subhierarchies; and
wherein the thread is a process that is part of a larger process or program.

36. The system of claim 33 wherein the thread interface frame includes a programming interface supporting a set of functions to regulate access to objects in the subhierarchies.

37. The system of claim 33 wherein the thread interface frame provides change notification for propagating a nonlocal option value to objects in the hierarchy, the nonlocal option being capable of storing a value, storing a default value and having the ability to optionally influence a value that is read using the same nonlocal option name on another object.

38. The system of claim 33 wherein the thread interface frame provides the ability for multiple threads to act on the subhierarchies, each thread controlling a different object.

39. An apparatus for operating on a hierarchy of objects comprising:
a means for partitioning the hierarchy into subhierarchies, and providing a thread interface frame between the subhierarchies; and
within a thread, a means for executing an operation on an object in one of the subhierarchies.

40. The apparatus of claim 39 further comprising:
a means for forwarding an effect of the operation to another subhierarchy accessed by another thread by storing the effect of the operation in the thread interface frame between the subhierarchies; and
wherein the thread is a process that is part of a larger process or program.

41. The apparatus of claim 39 wherein the thread interface frame includes a programming interface supporting a set of functions to regulate access to objects in the subhierarchies.

42. The apparatus of claim 39 wherein the thread interface frame provides change notification for propagating a nonlocal option value to objects in the hierarchy, the nonlocal option being capable of storing a value, storing a default value and having the ability to optionally influence a value that is read using the same nonlocal option name on another object.

* * * * *